Figure 3:
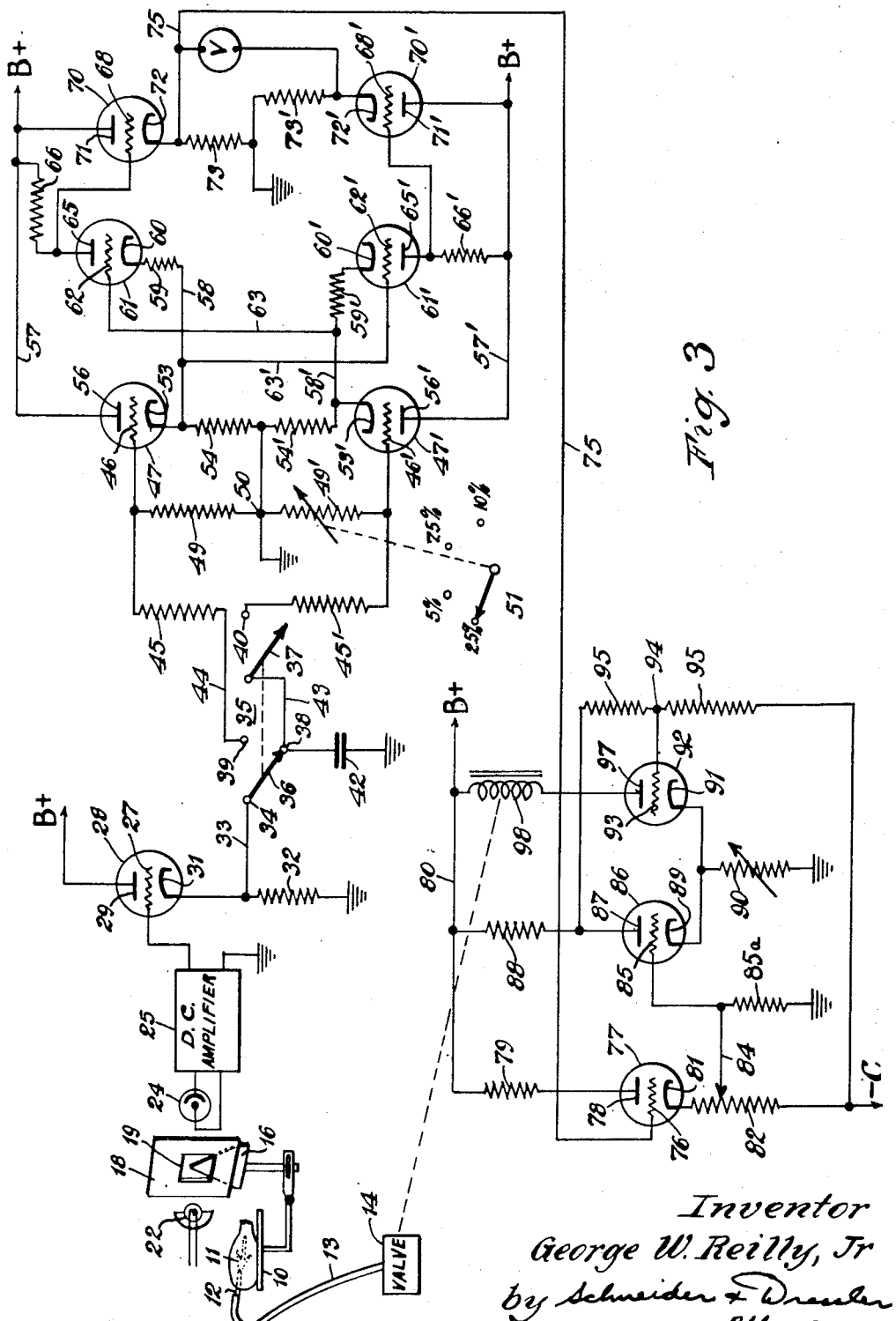

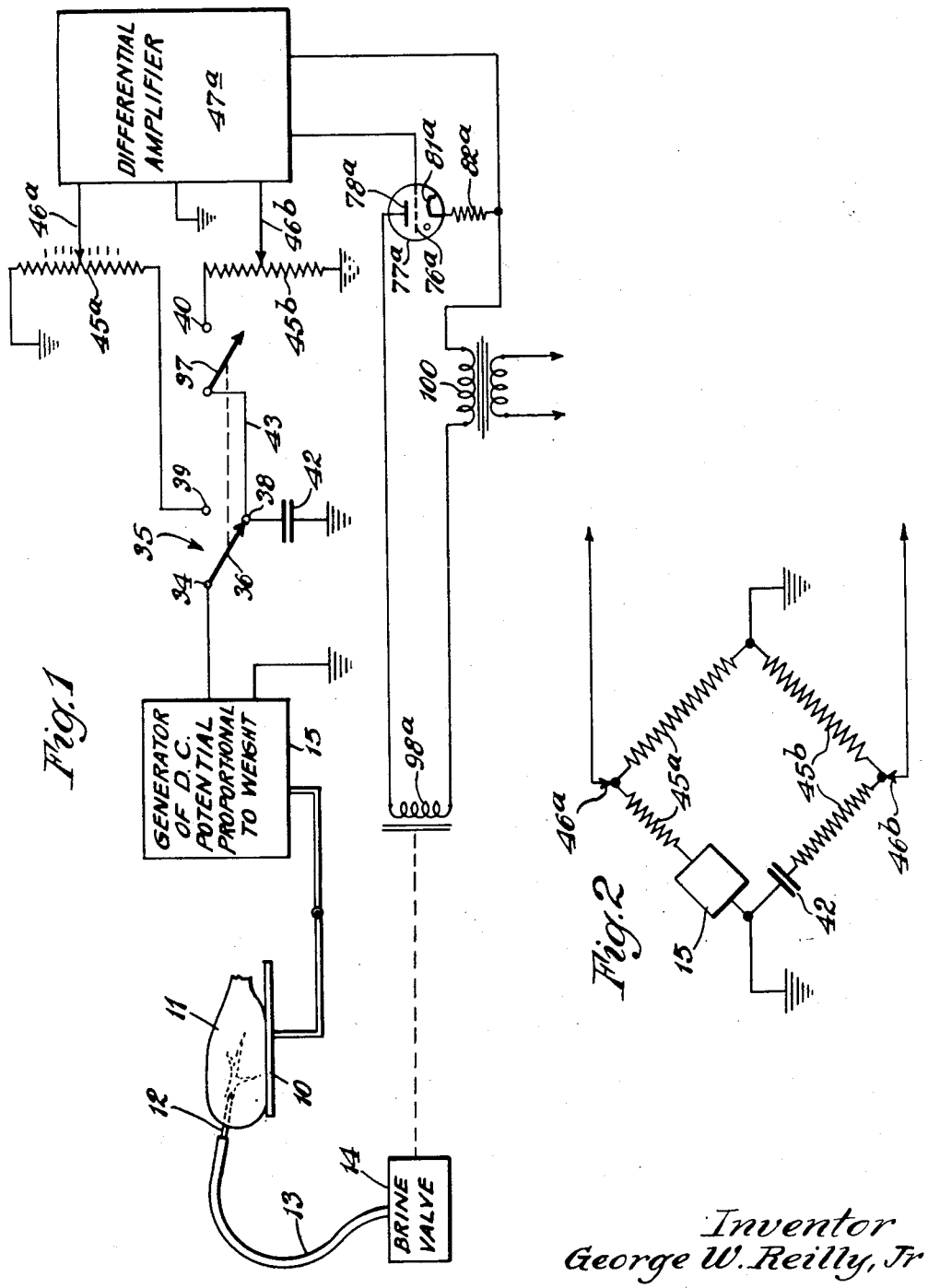

UNITED STATES PATENT OFFICE 2,581,204

WEIGHING SYSTEM FOR A PROCESSING OPERATION

George W. Reilly, Jr., Minneapolis, Minn., assignor to Wilson & Co., Inc., a corporation of Delaware Application June 7, 1950, Serial No. 166,707

12 Claims. (Cl. 99—256)

The present invention relates to weighing systems for use in processing operations wherein an article to be processed changes in weight during processing and wherein the desired change in weight during the processing is proportional to the original or base weight of the article prior to processing, irrespective of the value of that original weight. In the operation of the system of the present invention, the initiation and termination of the processing are controlled to secure the desired proportional change in weight during the processing operation.

In the prior copending applications of Lyman L. Campbell, Serial No. 17,520, filed March 27, 1948, and of Walter E. Moss et al., Serial No. 149,078, filed March 11, 1950, weighing systems are described wherein the article being processed may be, for example, a ham into which a certain percentage by weight of brine is to be pumped through the arteries of the ham. As a rule, hams for processing range in weight from about eight pounds to as much as twenty pounds and it is customary to add about 8% brine. In this particular application of such systems, the weight of the article during processing is increased but, as explained in the above identified applications, the weighing systems described and claimed in these applications as well as the instant weighing system are adapted for use in processing any article wherein the weight is increased or decreased by a fixed percentage during processing.

As is more fully disclosed in said prior applications, the addition or subtraction of a constant proportion of a base weight lying within a range of base weights involves an exponential function. In the systems described in said applications, the exponential factor in the operating characteristics of the machine is present in the mechanical parts of the system and cooperates with the scale used for weighing the article during processing. Under certain conditions it may be desirable to reduce to a minimum the mechanical elements operatively associated with the scale and to incorporate the exponential operating characteristics of the system in an entirely different portion of the system. The present invention relates to such a weighing system wherein the weight responsive portion of the system need only generate a potential whose magnitude is a linear function of the weight of the article being processed. Thereafter, a system embodying the present invention utilizes such a potential so that a predetermined proportional change in such a potential due to a change in the weight of the article during processing will suffice for terminating or otherwise controlling the processing of the article.

In order to simplify the explanation, it will be assumed that the article being processed is a ham. In general, the scale first determines the base weight of the ham prior to processing and in connection with this determination there is generated a potential having a value which is suitably a linear function of the base weight of the ham. This potential is utilized to store energy in some device, the level of such stored energy being a linear function of the potential generated and thus being a linear function of the base weight of the ham. Thereafter, the energy storage device is disconnected from the potential generator and processing of the ham is initiated. The outputs of the potential generator and of the energy storage device are connected to balancing means, suitably including a bridge and a differential or balanced amplifier, in such a manner that the generator output, which now varies with the weight of the article during processing, must change by a predetermined proportion of the potential level in the energy storage device in order to terminate the processing of the ham.

A simple energy storage device which may be utilized is a condenser which is charged to a potential linearly related to the base weight of the ham. Thereafter the condenser and the generator are balanced against each other in a bridge and the amount of potential necessary to obtain a balanced bridge condition or a predetermined degree of unbalance in the bridge is utilized for controlling the duration of the processing of the ham.

In order that the invention may be understood, it will now be explained in connection with the drawings wherein Fig. 1 shows a generalized form of the invention. Fig. 2 shows part of the system of Fig. 1 with the circuits established during processing of the ham being illustrated. Fig. 3 shows a specific embodiment of a system embodying the invention.

Similar parts in the three figures will be generally designated by similar numbers but with different subscripts in some instances. Thus referring to Fig. 1, any suitable weighing means such as a conventional scale has platform 10 upon which ham 11 may be disposed. Ham 11 has needle 12 clamped to an artery thereof and inserted in the proper position in accordance with accepted practice. Needle 12 is connected by flexible hose 13 to brine control valve 14 controlling the supply of brine from a brine tank not shown.

Platform 10 of the scale is adapted to operate some means 15 for generating a potential whose value is a linear function of the weight of the ham. Generator 15 may assume any one of a number of forms and may include means for amplifying and rectifying the potential to a value suitable for the purposes required. Thus as hereinafter described, one simple generator may consist of a light valve controlling the amount of light falling upon a photoelectric cell. Another means for generating a potential in accordance with the weight of a ham may involve a potentiometer system similar to float operated systems used for indicating the liquid level in automobile gas tanks and in other tanks. In using such a system, the float would be replaced by a mechanical connection to the scale platform.

It is also possible to utilize a variable condenser, the movable plates of which are operated by the scale platform. The variable capacitance of the condenser may be considered as a variable reactance in an alternating current circuit at a constant frequency, such a system being generally similar to the potentiometer system described above. In general, many systems are known for generating a potential having a linear relation to the movement of some mechanical element such as a scale platform.

Returning again to Fig. 1, the output of generator 15 is in the form of a direct current and this is impressed upon terminal 34 of switch 35 and ground. Switch 35 has movable contacts 36 and 37, contact 36 being connected to terminal 34 and cooperating with fixed contacts 38 and 39 while contact 37 cooperates with fixed contact 40. Contact 38 of switch 35 is connected to one side of condenser 42, the other side of which is grounded. Contact 38 is connected by wire 43 to movable contact 37.

Contact 39 is connected to one terminal of grounded resistor 45a. This resistor forms part of a potentiometer and has wiper 46a cooperating therewith. Wiper 46a may have a percentage scale associated therewith. Contact 40 is similarly connected to one side of grounded resistor 45b forming part of a potentiometer with which wiper 46b cooperates. Wipers 46a and 46b and ground form a three wire input to differential or balanced amplifier 47a. Such an amplifier is adapted to operate upon a difference in potential between 46a and 46b, the amplifier being balanced when the two wipers are at the same potential.

The output of amplifier 47a is fed to the input circuit of a suitable relay such as a grid controlled gas tube 77a. Thus, specifically, one terminal of the output of the amplifier is connected to control grid 76a of the tube while the other output terminal from the amplifier is connected to cathode 81a through cathode resistor 82a. Anode 78a is connected through winding 98a for operating brine valve 14 to a suitable source of alternating current, such as a transformer winding 100, back to cathode resistor 82a.

Switch 35 is shown in the position prior to the processing of the ham. After the base weight of the ham has been determined by the scale, the switch is moved to the position where movable contact 36 engages contact 39 while movable contact 37 engages contact 40. This position of the switch may be termed the pumping position.

Before describing the operation of the system shown in Fig. 1, a brief reference to Fig. 2 will now be made. This figure shows a portion of the system of Fig. 1 rearranged to emphasize the bridge characteristic of a part of the system. Thus for example, generator 15 and one part of resistor 45a forms one arm of the bridge between ground and wiper 46a. Another arm of the bridge is formed by the remainder of resistor 45a between ground and wiper 46a. A third arm of the bridge is formed by condenser 42 and part of resistor 45b between ground and wiper 46b. The last arm of the bridge is formed by the remainder of the resistor 45b between wiper 46b and ground. The output of the bridge between wipers 46a and 46b may be fed to any device which is sensitive to polarity and magnitude of an electric current.

The operation of the system will now be described. With switch 35 in the position as shown and ham 11 disposed on the scale prior to any pumping, the scale system is allowed to come to equilibrium corresponding to the base weight of ham 11. Condenser 42 is charged to a potential whose value is proportional to the base weight of the ham. Now switch 35 is moved to the pumping position. In this position of the switch, the relationship between condenser 42 and generator 15 is as shown in Fig. 2. Thus at the initiation of processing of the ham, the potential across condenser 42 will be equal to the potential across generator 15. It is clear from consideration of the bridge shown in Fig. 2 that the bridge arms containing resistance may be so arranged that the bridge may be balanced at the beginning of processing in which case there will be no difference of potential between wipers 46a and 46b. Such a zero potential between these wipers may be relied upon for opening the brine valve. In such a case, as the potential across the output of generator 15 increases with increase in weight of ham 11 there will be an increasing condition of unbalance of the bridge across wipers 46a and 46b. A predetermined amount of potential unbalance between these wipers may thus be relied upon for closing brine valve 14.

It is also possible to have the bridge shown in Fig. 2 unbalanced to a predetermined degree when the potentials across 15 and 42 are equal as is true at the beginning of processing. The unbalance may be in such a direction that the increase in potential across generator 15, due to the increase in weight of ham 11 during processing, will tend to move the bridge toward a condition of balance and when balance has been reached, the brine valve will be closed. Thus referring to Fig. 1 again, gas tube 77a may be arranged so that this tube fires when there is no difference in potential across the output of differential amplifier 47a. When gas tube 77a fires, winding 98a will be energized and brine valve 14 will be closed. It is clear that brine valve 14 may be of the type which is either normally closed or normally open, that gas tube 77a may normally fire or may normally be cut off, all depending upon whether the bridge shown in Fig. 2 is initially balanced or is initially unbalanced at the beginning of processing and moves toward a final balanced or unbalanced condition as the case may be. The arrangement of the polarity of the output of amplifier 47a together with the arrangement of the bias of control bridge 76a of gas tube 77a in order to determine the desired mode of operation of the bridge part of the system is well within the skill of the art and need not be described in detail.

Because of the bridge relationship, the additional potential due to processing will always be in constant proportion to the base weight potential. This proportion may be indicated by the scale with wiper 46a.

Referring now to the embodiment shown in Fig. 3, a scale having platform 10 carries ham 11. Needle 12, hose 13 and valve 14 are the same as in Fig. 1. Platform 10 is mechanically coupled to vane 16 of any suitable material which may act as a light valve. Thus vane 16 may consist of a thin sheet of aluminum and may have any desired shape. As shown here, vane 16 is triangular. The mechanical coupling between the scale platform 10 and the movable vane 16 is of the type commonly used in coupling a scale platform to an indicator to secure movement of the latter as a substantially linear function, such as is referred to, for example, in the aforesaid Moss et al. application and is not shown. Cooperating with vane 16 is barrier plate 18 having rectangular window 19 therein. It is understood that barrier 18 to opaque to light and is carried by suitable means. In the zero position of the scale, it is possible to have vane 16 register with window 19 so as to block the window either partially or completely, or it is possible to have vane 16 displaced from window 19 so that the window is fully open in the zero position. From the rest or zero position of the scale, the weight of a ham upon the scale platform will move the vane and control the effective area for light transmission as a linear function of the movement of the scale platform and of the weight thereon.

Disposed on one side of barrier 18 is light source 22 which, for convenience, is shown simply as a lamp. In practice, however, this light source may consist not only of a lamp but may also include a suitable condensing lens system so as to provide a substantially uniform illumination over the area of window 19. It is possible to obtain complex operating characteristics by having the light intensity different at different parts of the window so that vane movement results in a non-linear amount of light passing through the window.

Disposed on the far side of barrier 18 is photocell 24 of any suitable type. This cell may either be of the vacuum or gas tube type and may be provided with a suitable lens system to focus light passed by window 19 upon the cathode of the cell. Inasmuch as photoelectric cell systems are widely used and well known, a detailed description of the mechanical construction and lens requirements is not necessary.

Photocell 24 has its output connected to amplifier 25, which may be of the type for operating upon direct currents and may be any one of a number of types well known in the art. Thus for example, one suitable amplifier for direct currents is disclosed on pages 375 and 376 of the 1943 edition of Terman's "Radio Engineers Hand Book." Other hand books disclosing combinations of photocells and direct current amplifiers are also well known. The amplifier employed may suitably have linear operating characteristics.

Amplifier 25 has one output terminal grounded and the other output terminal connected to control grid 27 of vacuum tube 28. Tube 28 is operated as a cathode follower and has anode 29 connected to the positive terminal of a suitable source of constant potential. Cathode 31 is connected to grounded load resistor 32. Cathode 31 is also connected by wire 33 to switch point 34 of double pole double throw switch 35. Switch 35 has movable contacts 36 and 37. Contact 36 cooperates with two fixed contacts 38 and 39 while movable contact 37 cooperates only with fixed contact 40. As shown, when movable contact 36 touches contact 38, movable contact 37 is open. Contact 38 is connected to one side of condenser 42, the other side of this condenser being grounded. Contact 38 is also connected by wire 43 to movable contact 37. Fixed contact 39 is connected by wire 44 to one terminal of resistor 45, the other terminal of this resistor being connected to control grid 46 of vacuum tube 47. Fixed contact 40 is connected to resistor 45' the other terminal of this resistor being connected to control grid 46' of vacuum tube 47'. Control grids 46 and 46' are connected together by resistors 49 and 49', the junction of these two resistors being indicated by numeral 50 and being grounded. As shown, resistor 49' is variable and has associated therewith pointer 51 playing over a scale marked in percentages. This will be more fully explained later.

Vacuum tubes 47 and 47' are the first stage of a differential or balanced type of amplifier. Thus these two tubes have cathodes 53 and 53', respectively, connected together by bias resistors 54 and 54', the junction of these two resistors being connected to ground. These two resistors may be variable to balance the tubes. Tubes 47 and 47' have anodes 56 and 56' connected by wire 57 and 57' respectively to the terminals of suitable sources of constant potential.

Cathode 53 is connected by wire 58 through bias resistor 59 to cathode 60 of vacuum tube 61. Similarly cathode 53' is connected by wire 58' through bias resistor 59' to cathode 60' of vacuum tube 61'. Tubes 61 and 61' form the second stage of the balanced amplifier. Tubes 61 and 61' have control grids 62 and 62' cross-connected by wires 63 and 63' to wires 58' and 58 respectively. Tubes 61 and 61' also have anodes 65 and 65' respectively connected through load resistors 66 and 66' to wires 57 and 57' respectively. Anodes 65 and 65' are connected directly to control grids 68 and 68' of output tubes 70 and 70' respectively. Tubes 70 and 70' have anodes 71 and 71' connected directly to wires 57 and 57' respectively. These two tubes also have cathodes 72 and 72' connected through bias resistors 73 and 73' to ground. Across cathodes 72 and 72' is connected a center zero type of voltmeter which may be used to indicate balance when calibrating the system.

Cathode 72 is connected by wire 75 to control grid 76 of vacuum tube 77. Tube 77 has anode 78 connected through load resistor 79 to bus bar 80 going to the positive terminal of a suitable source of potential. It is understood that the negative terminals of the various sources of potential for providing space current for the various tubes are grounded. Tube 77 has cathode 81 connected through bias resistor 82 to the negative terminal of a C source of constant potential, the positive terminal of which is grounded as usual. Resistor 82 forms part of a potentiometer, this having wiper 84 connected to control grid 85 of vacuum tube 86 the grid being grounded through resistor 85a. Tube 86 has anode 87 connected through load resistor 88 to bus bar 80. Cathode 89 of tube 86 is connected to ground through variable resistor 90. Resistor 90 is also connected to cathode 91 of vacuum tube 92. Tube 92 has control grid 93 connected to point 94 on resistor 95 having one terminal connected to anode 87 and the other terminal connected to the minus C source of potential. Tube 92 has anode 97 connected through winding 98 to wire 80. Winding 98 is the energizing winding for control valve 14.

The operation of the system of Fig. 3 is as follows: Assuming that ham 11 is placed upon the platform of the scale, the scale will move vane 16 with reference to window 19 by a predetermined amount and permit a certain quantity of light to pass through the window. This light will fall upon cell 24 and result in a certain potential being generated in the cell. Amplifier 25 steps up this cell potential to a value suitable for use. The amplified potential is impressed upon control grid 27 of vacuum tube 28 and results in the potential of control grid 27 being made more positive. It is understood that the amplifier is so arranged that increased potential from cell 24 will result in increased positive potential upon control grid 27. As will be apparent later, this may be reversed if desired.

Vacuum tube 28 is so biased that a minimum potential output from the cell, corresponding to zero weight upon the scale platform, the tube will be cut off. With increasing positive potential upon control grid 27, more space current through the vacuum tube will flow, this current going through load resistor 32. As current increases through resistor 32, the potential of cathode 31 rises above ground to a value dependent upon the amount of current. With the switches in the position shown, the potential of cathode 31 will be impressed upon condenser 42 and charge the same. Preferably condenser 42 has substantial capacitance such as 100 or 150 microfarads, although smaller condensers may be used. Condenser 42 is preferably of a type having low leakage. When the scale platform has come to equilibrium corresponding to the base weight of the ham prior to any processing, the potential of condenser 42 with respect to ground will also reach a predetermined stable value. Switch 35 is now moved from the position shown so that movable contact 36 engages fixed contact 39 and movable contact 37 engages fixed contact 40. As soon as this occurs, the potential of condenser 42 will be impressed upon control grid 46' of amplifier 47'. At the same time, the potential of cathode 31 will be impressed upon control grid 46 of vacuum tube 47. It is clear that the potential on control grids 46 and 46' will be determined by the relative ratios of resistances 45 and 49 on the one hand and 45' and 49' on the other hand. Resistor 49' is so adjusted that initially the potential on control grids 46 and 46' are not equal. By properly calibrating the scale over which pointer 51 moves, it is possible to unbalance the resistance network so that the additional potential required to balance the network at control grids 46 and 46' corresponds to a desired proportion of weight increase.

It is clear that since tubes 47 and 47' are not balanced, that following stages 61 and 61' and 70 and 70' are also unbalanced. Thus at the output of tubes 70 and 70' there will be a difference in potential between the two cathodes. When these tubes are perfectly balanced, the cathodes will be at the same potential. In the system shown, control grid 46 initially will be negative with respect to control grid 46'. This is due to the fact that as the weight of the ham increases due to brine being pumped therein, the potential of cathode 31 will rise and raise the potential of control grid 46. Assuming therefore that control grid 46 is initially negative with respect to control grid 46', it follows that cathode 53 will be negative to cathode 53' and thus control grid 62' of vacuum tube 61' will be negative with respect to control grid 62. This means therefore that anode 65' will be positive or at a higher potential than anode 65 and thus cathode 72' of vacuum tube 70' will be at a higher potential above ground than cathode 72. In short, cathode 72 will be below the balanced condition potential and this will cause control grid 76 to be negative and cut off vacuum tube 77. Thus the potential impressed upon control grid 85 will be substantially negative to ground and will cut tube 86 off. The high positive potential at anode 87 will cause tube 92 to conduct, the space current passing through winding 98 of valve 14 and causing the valve to open. When the valve opens, brine is pumped into ham 11 and the weight of the ham increases. With increase in weight more light is admitted to cell 24 and the potential of cathode 31 rises. This rising potential is impressed upon control grid 46 until the potential at control grid 46 is substantially equal to the potential at control grid 46' due to condenser 42. When the two tubes are balanced, the potential at cathode 72 rises to the point where vacuum tube 77 conducts. When this occurs, tube 86 conducts while tube 92 is cut off. When tube 92 is cut off, current for the operating winding for valve 14 is interrupted and the valve is closed.

It is desirable that the time constant for the circuit in which condenser 42 is disposed, during processing, be sufficiently great so that the potential across condenser 42 remains constant during the operating cycle of the system. This time constant will be determined principally by the amount of resistance in 45' and 49'. In practice, an operating cycle for increasing the weight of the ham may be of the order of a few minutes and the potential across the plates of condenser 42 may be made to remain substantially constant. It is, of course, possible to interpose a direct current amplifier between contact 38 and contact 40 so that substantially no current drain on condenser 42 will occur during pumping of the ham.

It is clear that instead of amplifier 25, a conventional amplifier for alternating current may be provided with the rectified output being fed to control grid 27. In such case, the photocell will preferably be fed with alternating potential so that modulation may occur.

I claim:

1. In a weighing system in which the article being weighed is subject to processing resulting in a change in weight, the combination of means for generating an electric potential having a value which is a linear function of the weight of the article, a condenser, means for initially charging said condenser from said potential generator to a potential corresponding to the base weight of the article prior to processing, means for disconnecting said charged condenser and initiating processing of said article, means for comparing the instantaneous potential at the output of said generator during article processing with the potential of the charged condenser, and means responsive to a difference in potential between the base weight potential and instantaneous processing potential corresponding to a proportional change in weight of the article for terminating processing.

2. In a weighing system in which the article being weighed is subject to processing causing a change in weight and in which a percentage change in the base weight of the article is desired, the combination means for generating a potential having a value which is a linear function of the article weight, a condenser, means for connecting said condenser to said generator to be charged thereby prior to processing to a potential corresponding to the base weight of the article, means for disconnecting said condenser from said generator and initiating processing of said article, a bridge, means for feeding the generator output during article processing to said bridge, means for connecting said condenser to said bridge so that said two potentials oppose each other and means responsive to potential conditions in said bridge for terminating said processing when the generator output differs from the condenser potential by a predetermined percentage corresponding to the desired change in weight of said article.

3. In a weighing system in which the article being weighed is subject to processing causing a change in weight and in which the processing is to be terminated after said article has changed its weight by a predetermined percentage of its base weight, the combination of means for generating a direct potential having a value which is a function of the article weight, a condenser, means for connecting the generator to said condenser during the initial weighing of said article prior to processing so that said condenser is charged to a potential corresponding to the base weight of the article, means for disconnecting said condenser from said generator, a bridge, means for connecting said generator output and said condenser to said bridge so that the two potentials are compared to each other in the bridge, means for initiating processing of said article, and means for varying the bridge potentials so that a predetermined proportional change in generator potential from the base weight potential will cause a change in bridge conditions between balance and a predetermined amount of unbalance and means responsive to such change in bridge conditions for terminating article processing.

4. In a weighing system in which the article being weighed is subject to processing causing a change in weight and in which the processing is to be terminated after a predetermined percentage variation in base weight of the article has occurred, the combination of means for generating a potential having a value which is proportional to the weight of the article, a condenser, means for connecting said condenser to said generator output to be charged to a potential corresponding to the base weight of the article, means for disconnecting said charged condenser from said generator, a bridge, means for connecting said condenser in one arm of said bridge, means for connecting said generator in another arm of said bridge, means for initiating processing of said article, and means connected to two diagonal points of the bridge and responsive to any potential difference between said diagonal points for terminating said processing when the generator potential differs from the potential of the charged condenser by a predetermined proportion of the condenser potential.

5. In a weighing system in which the article being weighed is subject to processing causing a change in weight and in which the processing is to be terminated after said article has changed weight by a predetermined percentage of its base weight, the combination of means for generating a potential proportional to the weight of said article, a condenser, means for connecting said condenser to said generator during initial weighing of said article and prior to processing so that said condenser is charged to a potential corresponding to the article base weight, means for disconnecting said condenser from said generator, a resistance bridge having four arms, means for inserting said condenser in one of said arms, means for inserting said generator output in another bridge arm, means for maintaining two diagonally spaced bridge points at a predetermined constant potential such as ground, and means connected to the remaining two bridge points and responsive to potential conditions at said remaining points for terminating said processing upon said generator output potential reaching a value whose difference from the condenser potental represents the predetermined proportional change in weight of said article.

6. In a weighing system in which the article being weighed is subject to processing causing a change in weight and where the processing is to be terminated after said article has changed weight by a predetermined percentage of its base weight, the combination of means for generating a potential proportional to the weight of said article, a condenser, a pair of resistors, means for connecting the generator output to said condenser to charge the same while the base weight of the article is being obtained, switching means for disconnecting said condenser from said generator after said condenser has been charged to a potential corresponding to the base weight of said article and for connecting said generator and said condenser to said resistors, means for initiating article processing, means for obtaining predetermined portions of the potentials across the two resistors, and means responsive to said predetermined potential portions for terminating said processing when the generator output has varied from the base weight potential by a predetermined percentage.

7. The system of claim 6 wherein said last named means include a differential amplifier.

8. In a weighing system in which the article being weighed is subject to processing causing a change in weight and in which the processing is to be terminated after said article has changed weight by a predetermined percentage of its base weight, the combination of means for generating a potential directly proportional to the weight of said article, said generator having one terminal grounded and the other terminal free, a condenser having one grounded terminal, a pair of resistors with a terminal on each resistor grounded, switching means for connecting the free terminal of said generator to the free terminal of said condenser for charging the same during the time that the base weight of the article is being established and prior to processing, means for operating said switching means to disconnect said condenser from said generator and to connect the free terminal of the generator and condenser to the free terminals respectively of the two resistors, means controlled by said switching means to initiate processing, a potentiometer connection for each resistor, and differential amplifier means fed by said potentiometer connections and responsive to a predetermined difference in potential between said potentiometer connections for terminating the processing when the potential from the generator has changed by a predetermined percentage of the base potential.

9. In a weighing system in which the article being weighed is subject to processing causing a change in weight, the combination of a scale, means controlled by said scale for generating a potential whose value is proportional to the article being weighed, a condenser, means for charging said condenser from said potential generating means to a potential corresponding to the base weight of the article prior to processing, a balanced amplifier consisting of at least one pair of vacuum tubes, each having cathode, control grid and anode, a resistance network for each vacuum tube, means for connecting the control grid of one vacuum tube to a point on one of said resistance networks, means for connecting the control grid of the second vacuum tube to a point on the second resistance network, means for disconnecting said condenser from said potential generating means and connecting said condenser across the terminals of one of said resistance networks, means for connecting the output of said potential generating means across the terminals of the other resistance network, said two networks having one common terminal connected to the cathodes of said two vacuum tubes, said two networks being so arranged that said vacuum tubes are unbalanced when equal potentials are applied across the two networks, means controlled by said balanced amplifier for initiating processing of the article whereby the article weight is varied, thus resulting in potential variation at the output of said potential generating means, said potential variation being so poled as to tend to restore the tubes to balance and means controlled by the amplifier when balanced for terminating the processing.

10. In a system for controlling the variation of weight of an article during processing, the combination of means responsive to the weight of the article for generating a potential having a value which is proportional to the weight of said article, a condenser, means for charging said condenser from said potential generating source to a potential proportional to the base weight of the article prior to processing, a differential amplifier, means for connecting said condenser to the input of said amplifier, means for connecting the potential generating means to the other input of said amplifier, means controlled by said system for initiating the processing of said article so that the weight changes, and means controlled by said amplifier for terminating said processing when the potential at the output of said generating means has varied by a predetermined proportion of the value of the potential to which the condenser was charged.

11. In a system for controlling the processing of an article during which the weight of the article varies, the combination of means for generating a direct potential having a value which is proportional to the weight of the article, a condenser, means for connecting said condenser across said potential generating means to charge said condenser to the potential corresponding to the base weight of the article prior to processing, means for disconnecting said condenser and initiating processing of said article and thus causing the weight of said article to change, a differential amplifier having a three wire input, means for applying the potential of said condenser and the output of said potential generating means to the input of said amplifier for comparison purposes, and means controlled by said differential amplifier for terminating said article processing when the potential generating means has its output potential differing from the condenser potential by a predetermined proportion of the condenser potential.

12. In a system for controlling the processing of an article during which processing the weight of the article varies, means for generating a potential having a value which is proportional to the weight of the article, a condenser, means for connecting said condenser to said potential generating means to be charged thereby to a potential corresponding to the base weight of the article prior to processing, a differential amplifier having a three wire input, one wire being common, means including a resistance network for impressing a predetermined proportion of the condenser potential across one part of the differential amplifier input, means including a resistor network for impressing the output of the potential generating means across the input of the other part of the differential amplifier for comparing said potential with the potential derived from said condenser, means for varying the relative proportion of the potentials applied to the inputs of the amplifier from said resistor networks and means controlled by said differential amplifier for terminating the processing when the weight of said article has changed by a predetermined proportion, thus resulting in the derived potential changed by a predetermined proportion.

GEORGE W. REILLY, Jr.

REFERENCES CITED

The following references are of record in the file of this patent:

UNITED STATES PATENTS

| Number | Name | Date |
|---|---|---|
| 2,389,113 | Reichel | Nov. 13, 1945 |